(12) United States Patent
Forlenza et al.

(10) Patent No.: US 7,349,800 B2
(45) Date of Patent: Mar. 25, 2008

(54) ADAPTABLE NAVIGATION SYSTEM

(75) Inventors: Randolph Michael Forlenza, Austin, TX (US); John Paul Kaemmerer, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 11/104,045

(22) Filed: Apr. 12, 2005

(65) Prior Publication Data

US 2006/0229806 A1 Oct. 12, 2006

(51) Int. Cl.
*G01C 21/00* (2006.01)
(52) U.S. Cl. .................. 701/207; 701/25; 701/224
(58) Field of Classification Search ........ 701/200–202, 701/207–208, 213–215, 25–28, 224; 340/988, 340/995.1; 342/357.06, 357.12, 357.13
See application file for complete search history.

(56) References Cited

U.S. PATENT DOCUMENTS

| 4,796,189 | A | 1/1989 | Nakayama et al. ......... 364/449 |
| 5,083,256 | A | 1/1992 | Trovato et al. ............. 364/148 |
| 5,229,941 | A | 7/1993 | Hattori .................. 364/424.02 |
| 5,657,226 | A | 8/1997 | Shin et al. ............ 364/424.027 |
| 6,405,123 | B1 * | 6/2002 | Rennard et al. ............ 701/200 |
| 6,415,226 | B1 | 7/2002 | Kozak ........................ 701/210 |
| 6,456,934 | B1 | 9/2002 | Matsunaga et al. ......... 701/210 |
| 6,864,807 | B2 * | 3/2005 | Todoriki et al. ............ 340/988 |
| 6,978,207 | B2 * | 12/2005 | Katou ........................ 701/201 |
| 2004/0215392 | A1 | 10/2004 | Nam et al. .................. 701/210 |

* cited by examiner

*Primary Examiner*—Yonel Beaulieu
(74) *Attorney, Agent, or Firm*—David A. Mims, Jr.; Rudolf O. Siegesmund; Gordon & Rees, LLP

(57) ABSTRACT

The invention is a new and useful improvement to navigation system software that, when combined with conventional navigation system hardware, provides an operator with a means for modifying a course generated by a navigation system, and for saving the modified course for future trips. More specifically, the invention comprises an improvement to navigation system software that provides several manual means for modifying a computer-planned course according to real-time operator preferences; and an improvement to navigation system software that provides an automatic means for adapting navigation system planning to conform to a course that an operator has used repetitively.

4 Claims, 4 Drawing Sheets

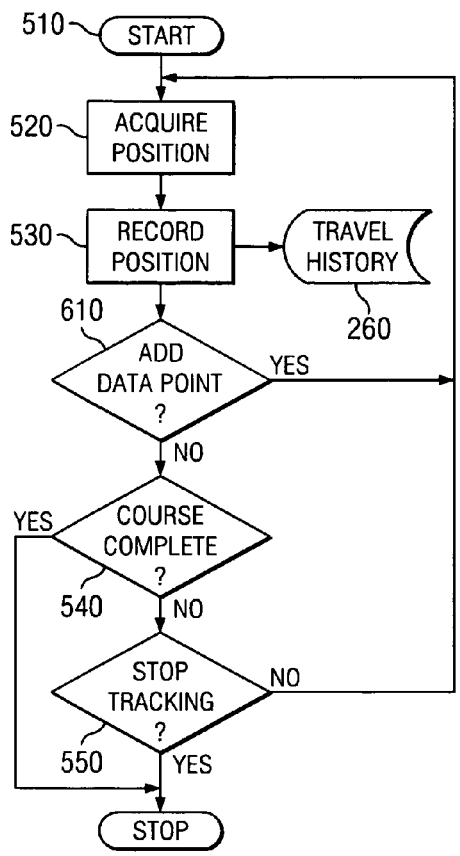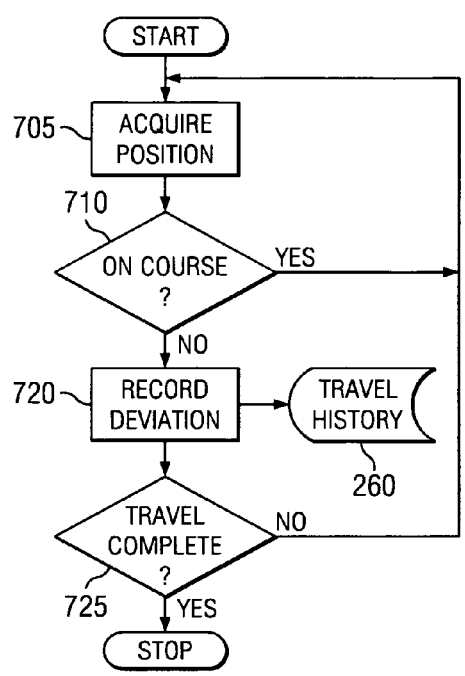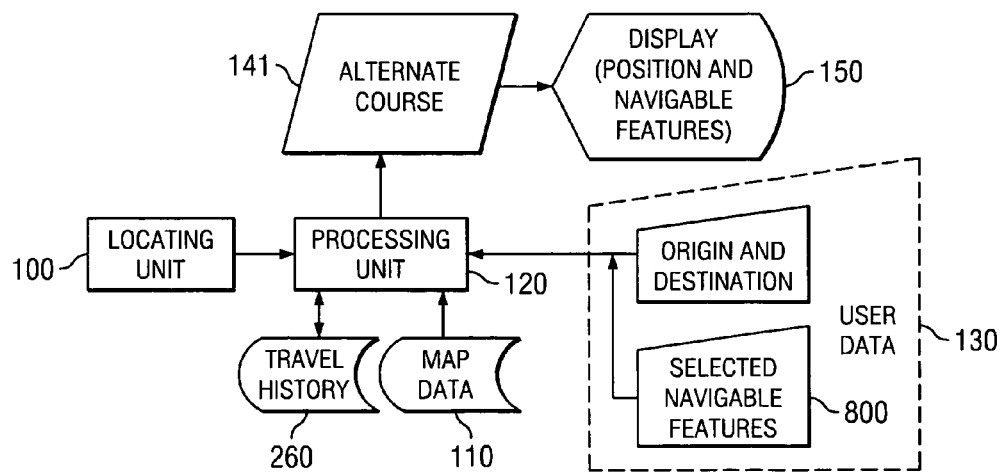

ADAPTABLE NAVIGATION SYSTEM

FIELD OF THE INVENTION

The invention described herein is related generally to data processing systems that determine a course of travel, and specifically to improvements to such data processing systems that allow a user to alter the determined course of travel on demand.

BACKGROUND OF THE INVENTION

Many vehicles presently include sophisticated navigation systems that can identify a route between two geographic positions. A primary function of these navigation systems is to identify a course between the vehicle's current position and a destination specified by an operator. See, for example, U.S. Pat. No. 4,796,189 (issued Jan. 3, 1989).

Although many conventional navigation systems evaluate time and distance when planning a course, they do not consider many other factors that an operator may deem important. For example, an operator may prefer a course that provides more scenery, less traffic, or avoids a dangerous intersection. Most navigation systems provide no means for an operator to modify or override the planned course. And once a navigation system identifies a course between two locations, the navigation system typically monitors the vehicle's movement for deviations from the planned course. If the navigation system detects a deviation, it typically generates an alert, re-plans the course, or both, which can be annoying to an operator that is attempting to plan an alternate course.

One example of a navigation system that does provide such a means for modifying the navigation system's route is found in U.S. Pat. No. 6,456,934 (issued Sep. 24, 2002) [hereinafter "the '934 patent"]. The '934 patent describes a system that "enables a user arbitrarily to set an alternative path." A user of the system described in the '934 patent can "specify the final point of a detour and, hence, can arbitrarily set an alternative path." To use the system described in the '934 patent, an operator uses an input device to enter a detour request at any given position, and a "final point" of the detour. The system then retrieves one or more alternative paths "interconnecting the current position of the vehicle and the final point of detour." Finally, according to the operator's preference, the system links the final point of detour to the original course, or to the final destination.

Although the system described in the '934 patent overcomes some of the shortcomings of earlier navigation systems, there is nonetheless plenty of room for improvement. In particular, neither the system of the '934 patent nor any other known system provides a means for an operator to select particular features to create a custom course that conforms to the operator's travel preferences. Moreover, no known system is capable of adapting computation routines to remember and consider such custom courses for future travel.

SUMMARY OF THE INVENTION

The invention described below is a new and useful improvement to navigation system software that, when combined with conventional navigation system hardware, provides an operator with a means for modifying a course generated by a navigation system, and for saving the modified course for future trips. More specifically, the invention comprises an improvement to navigation system software that provides several manual means for modifying a computer-planned course according to real-time operator preferences; and an improvement to navigation system software that provides an automatic means for adapting navigation system planning to conform to a course that an operator has used repetitively.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

FIG. 6 is a flowchart of a third method for entering and saving an alternate course in a navigation system;

FIG. 7 is a flowchart of a fourth method for entering and saving an alternate course in a navigation system;

FIG. 8 is a functional block diagram illustrating how the novel methods and components of the present invention interact with components of a conventional navigation system.

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described below, though, as a generic computer program that configures and enables hardware components of a navigation system to implement the novel aspects of the invention. For illustrative purposes, the inventive computer program will be referred to as the "Course Modification Program." Additionally, the invention includes an improvement or addition to conventional user interface software, which is referred to and described as the "Navigable Feature Selection Program," and includes an additional data component referred to as the "Travel History" data.

Figure 1:
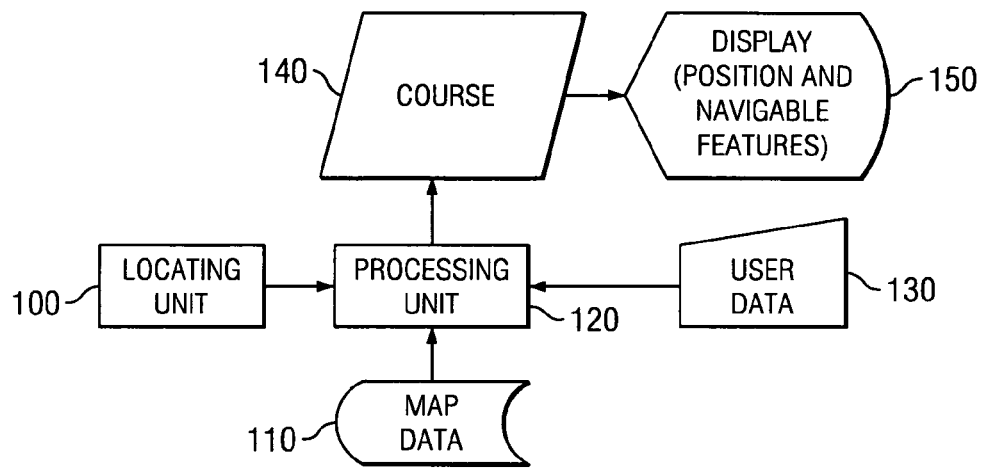
FIG. 1 is a functional block diagram of an exemplary configuration of a prior art navigation system.

The Course Modification Program and Navigable Feature Selection Program are described below with reference to an exemplary configuration of navigation system hardware, which is illustrated in FIG. 1. Although the various functions of the navigation system hardware may be integrated into a single physical device, these functions are divided into a "position locator unit" and a "processing unit" for illustrative purposes. FIG. 1 is a functional block diagram illustrating the interaction of the position locator unit and the processing unit with a user and with stored data in a typical prior art navigation system. Position locator unit 100 represents any combination of hardware and software that is operable to locate the unit's position within a given frame of reference. The navigation system may be implemented in a vehicle, such as an automobile, boat, or aircraft, or as a portable, hand-held unit. The following description, though, assumes that the navigation system is integrated into a vehicle and that the unit's position is coincident with the vehicle's position. The satellite navigation system developed by the United States Department of Defense commonly referred to as the "Global Positioning System" is an example of specific type of position locator unit that is commonly used in conventional navigation systems, and is suitable for use with the Course Modification Program. Radar and other types of position locator units are well-known in the industry, and are suitable for use with the Course Modification Program as well. Map data 110 also is a well-known component, which constitutes any collection of data that represents navigable features within a geographic area. The term "navigable feature," as used herein, refers to any improved or unimproved road, trail, waterway, air corridor, or other transportation route. Processing unit 120 represents a computer or any combination of hardware and software operable to calculate or otherwise plan a course of travel given user data 130 and map data 110. The course of travel is represented in FIG. 1 as course data 140. User data 130 typically consists of a point of origin and a destination. The user can specify a particular point of origin, or processing unit can acquire a current position from position locator unit 100 and use the acquired position as the point of origin. In general, though, a user must enter or select a particular destination before processing unit generates course data 140. Processing unit 120 typically displays course data 140 and the vehicle's current position on an output device, represented as display 150 in FIG. 1.

Figure 2:
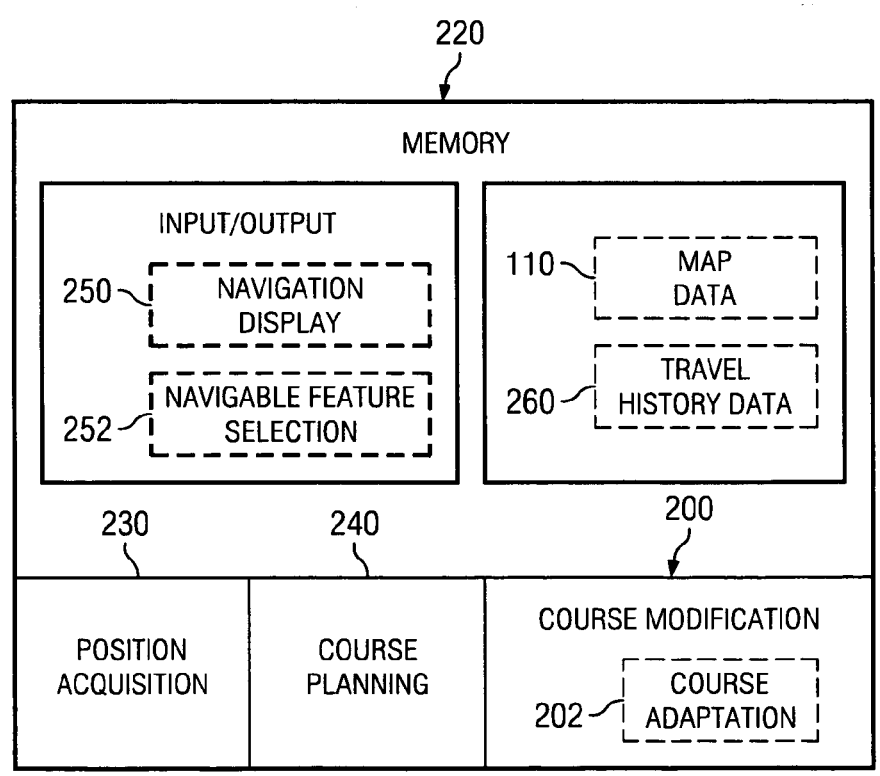
FIG. 2 is a schematic of a memory having components of the present invention stored therein.

Course Modification Program (CMP) 200 and its components, including Course Adaptation Program 202, typically are stored in a memory, represented schematically as memory 220 in FIG. 2. The term "memory," as used herein, includes without limitation any volatile or persistent medium, such as an electrical circuit, magnetic disk, or optical disk, in which a computer can store data or software for any duration. A single memory may encompass and be distributed across a plurality of media. Thus, FIG. 2 is included merely as a descriptive expedient and does not necessarily reflect any particular physical embodiment of memory 220. As depicted in FIG. 2, though, memory 220 may include additional data and programs, with which CMP 200 interacts. Of particular importance to CMP 200 and its components, memory 220 generally includes Position Acquisition Program 230, Course Planning Program 240, input/output programs, and resource data. The input/output programs generally consist of conventional components such as Navigation Display Program 250, but also include Navigable Feature Selection Program 252. Resource data comprises conventional map data 110 and an additional component of the present invention, travel history 260.

CMP 200 implements three distinct methods for manually modifying course data generated by a conventional navigation system, as well as a method that requires no direct user interaction. Each of the methods is described in detail below, but the general context in which these methods find utility is presented before describing such details.

In a preferred embodiment of the invention, Navigable Feature Selection Program 252 provides a graphical user interface (GUI) that allows a user to control each method, but acceptable alternatives include any command line or audio interface. In general, the GUI comprises a conventional display of map data 110 with a center coincident with a vehicle's current position, as determined by position locator unit 100. The display typically includes navigable features and topography in the vicinity of the vehicle's current position, as well. Such displays are well-known and need not be described in detail here, but common features include user-controlled magnification and centering. Thus, a user can control the amount of map data 110 displayed, as well as the level of detail. If the user has requested a course and specified a destination, and processing unit 120 has generated course data 140, then the GUI also usually overlays and highlights course data 140 on display 150.

Appropriately labeled command buttons activate various functions described below. Command buttons are well-known interface elements that need not be described in detail herein, but common examples include physical buttons or graphical elements integrated into the GUI, including selectable menu items. Specific command buttons and features are introduced and described below in the context of a particular method.

Figure 3:
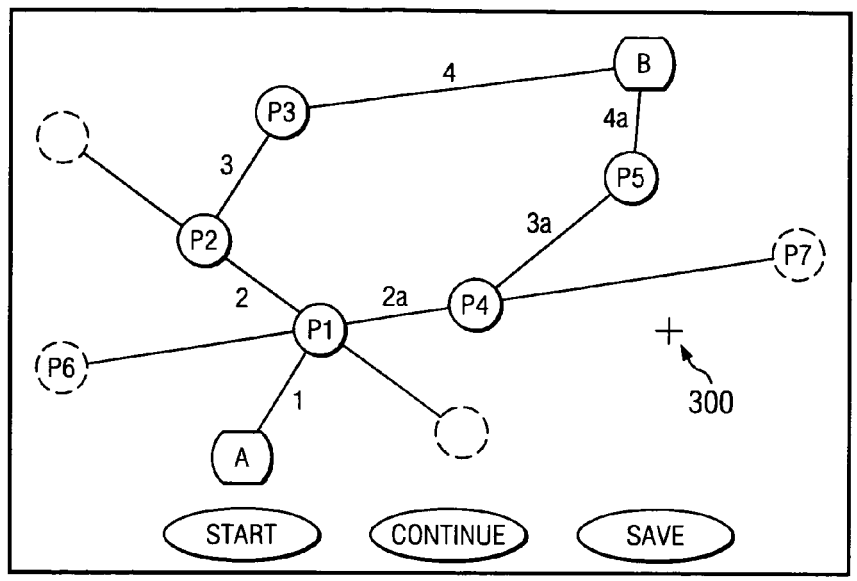
FIG. 3 illustrates interface elements of the Navigable Feature Selection Program.

FIG. 3 represents the common GUI elements of Navigable Feature Selection Program 252, which includes a map of hypothetical course data 140. The GUI elements include navigable features and "segments" thereof, "guide points," and command buttons. As used here, the term "guide point" refers to any discrete unit of map data 110 having navigational significance. Thus, a guide point can represent an intersection between two or more navigable features, a geometric point of a navigable feature, a landmark, a specific street address, or any other arbitrary data point that may be useful for determining or confirming a course or position. A navigable feature "segment," then, refers to any portion of a navigable feature lying between two guide points. For example, in FIG. 3 the line drawn from guide point P6 to P7 represents both a navigable feature and a navigable feature segment, while the portion of that line lying between guide points P1 and P4 is a navigable feature segment only, denoted as segment 2a. Course data 140, which is provided merely as a simple example for illustrative purposes, comprises an origin denoted as point A; course data denoted as guide points P1, P2, and P3; and a destination denoted as point B. Segments 1, 2, 3, and 4 represent navigable feature segments between the respective guide points in course data 140. FIG. 3 also includes alternate course data 141, which includes the same origin and destination (i.e. points A and B, respectively), but alternate guide points P4 and P5, and alternate segments 2a, 3a, and 4a. Thus, for purposes of the following description, course data 140 is representative of a course that a conventional navigation system would generate automatically if a user requested a course between points A and B, while alternate course data 141 is representative of a course that a conventional navigation system would not generate under the same conditions. Common examples of alternate course data 141 would include segments that may be longer than those in course data 140, but which may be more scenic or avoid common traffic problems. Alternate course data 141 also may represent new navigable features that may not exist in map data 110.

So the basic scenario in which the features and functions of the present invention are described is as follows, with reference to FIG. 3 for illustration: points A and B have been designated as an origin and destination, respectively; processing unit 120 has generated course data 140 consisting of guide points P1 through P3 and segments 1-4, which are presented to a user through a GUI such as that illustrated in FIG. 3; and a user now wants the navigation system to use alternate course data 141. Note that course data 140 may be highlighted or otherwise emphasized to distinguish it from other elements on the display.

Figure 4:
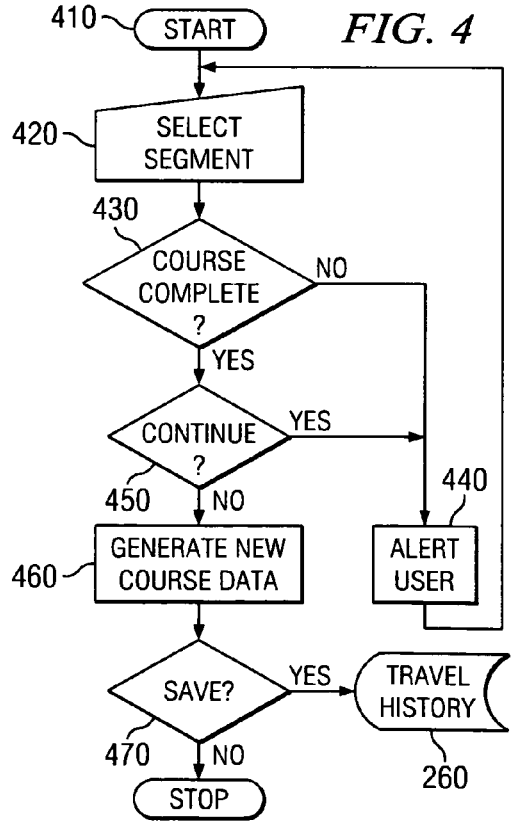
FIG. 4 is a flowchart of a first method for entering and saving an alternate course in a navigation system.

FIG. 4 is a flowchart of the first method implemented in the present invention. The first method allows a user to modify course data 140 in advance of commencing travel, although it also could be used to modify the course while en route. In addition to the basic GUI described above with reference to FIG. 3, the GUI to this method comprises a cross-hair or other similar on-screen pointer, represented in FIG. 3 as pointer 300, that a user manipulates to select alternate navigable features from the map. Thus, to use this method to instruct the navigation system to use alternate course data 141, alternate course data 141 must already be available in map data 110. The user begins by activating a first command button, labeled "START" in FIG. 3, and manipulating pointer 300 to select a navigable feature that deviates from course data 140. Continuing with the hypothetical described above and presented in FIG. 3, in which the user wants the navigation system to use alternate course data 141 instead of course data 140, the user would activate the START command button (410) and select a navigable feature (420) that includes any of segments 2*a*, 3*a*, or 4*a*. Although the order is not important, this description assumes that the user selects the navigable feature terminated by points P6 and P7, which includes segment 2*a*. After the user selects this navigable feature, processing unit 120 must determine if the selected navigable feature provides a complete alternate course (430). A "complete alternate course" is any combination of navigable feature segments that connects either the origin or a navigable feature in the original course to either the destination or another navigable feature in the original course. Since the selected navigable feature between guide points P6 and P7 satisfies none of these conditions, processing unit 120 causes the GUI to alert the user that the alternate course is not complete (440). Typically, the alert comprises a visual cue such as flashing or blinking the display of the original course, the selected navigable feature, or both, but the alert also may comprise any other suitable audible or visual cue. Steps 420 through 440 then are repeated until the user has selected a complete alternate course. If the user has selected a complete alternate course that connects to the original course, the user can activate a second command button (such as the one labeled "CONTINUE" in FIG. 3) and continue the process (450) any number of times until satisfied with the alternate course, or until the alternate course connects directly with destination B. Course Adaptation Program 202 then generates alternate course data (460) comprising as much of course data 140 and alternate course data 141 as needed to provide a complete route. Finally, the user optionally can activate a third command button, such as the "SAVE" command button depicted in FIG. 3, to save the new course data (470) in travel history data 260.

Figure 5:
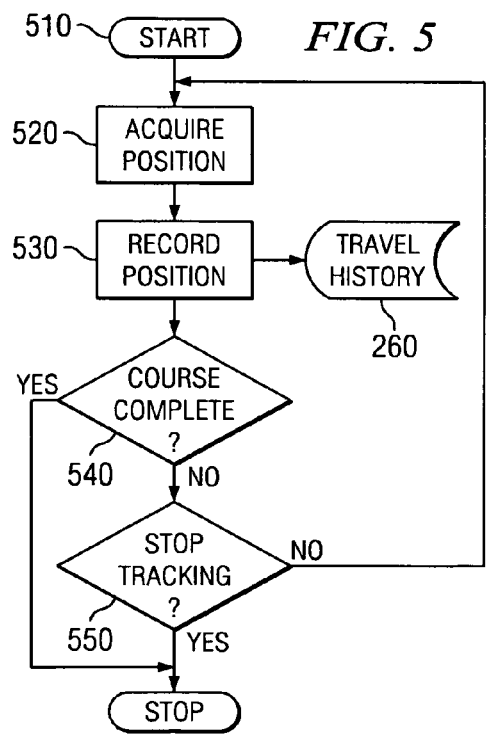
FIG. 5 is a flowchart of a second method for entering and saving an alternate course in a navigation system.

FIG. 5 is a flowchart of the second method implemented in the present invention. This second method allows the user to modify course data 140 while en route. To activate this second method, the user activates the START command button (510) at any place where the user desires to deviate from the course data 140. In this context, the START command button causes the processing unit 120 to acquire the vehicle's current position (520) from position locator unit 100, and to record the current position (530). Thus, in the basic scenario described above wherein the user desires to deviate from course data 140 at guide point P1, the user activates the START command button when the vehicle reaches the intersection marked as guide point P1, and processing unit 120 acquires data from position locator unit 100 indicating that the vehicle's position is coincident with guide point P1, and records guide point P1. Processing unit 120 thereafter acquires the vehicle's position periodically (520) from position locator unit 100, records the position (530), and determines if the vehicle has traveled a complete alternate course (540). Thus, processing unit 120 continues to track the subsequent movement of the vehicle until the vehicle has traveled such a complete alternate course, or until the user expressly instructs processing unit 120 to stop tracking (550). Referring again to FIG. 3, processing unit 120 would track the vehicle's course along segments 2*a*, 3*a*, and 4*a*, until the vehicle reaches destination B or until the user activates a command button to expressly stop such tracking. The command button that expressly stops tracking could be the START or SAVE command button described above, or perhaps a command button designated as the "FINISH" button (not shown). Processing unit 120 also would record positions acquired between guide point P1 and destination B, or whatever point the user expressly stops tracking, in travel history 260. In one embodiment, processing unit 120 records such positions directly in travel history 260 (as shown in FIG. 6), but in an alternate embodiment, processing unit 120 records the positions in a temporary memory and transfers the data to travel history 260 only if the user expressly activates an appropriate command button (such as the SAVE command button). As users will appreciate, a significant advantage of this second method is that alternate course data 141 need not exist in map data 110. Alternate course data could represent newly completed or lesser-known navigable features. The second method just described effectively allows a user to dynamically accumulate data, which Course Adaptation Program 202 can use to generate course data (as described below).

The third method, illustrated in the flowchart of FIG. 6 is similar to the second method, but provides additional detail to travel history 260. To provide the additional detail, the user activates a command button, such as the START command button or an additional PATH command button (not shown in FIG. 3), at each turn between guide point P1 and destination B to signal processing unit 120 (610) to acquire the vehicle's position (520) and record the position (530). Thus, continuing with the example illustrated in FIG. 3 to illustrate this third method, if the user activates the START command button at guide point P1 to indicate a deviation from course data 140, then the user subsequently activates the START/PATH command button again at guide points P2 and P3, which correspond to specific turns or intersections in the alternate course. This method ensures that all significant guide points are included in travel history 260.

A fourth method, illustrated in flowchart form in FIG. 7, also is a variation of the second method, but requires no direct user interaction. Whereas the second method requires a user to activate a command button to indicate a deviation from course data 140, this fourth method is activated automatically when processing unit generates course data 140. Processing unit 120 periodically acquires the vehicle's position (705) from position locator unit 100 and compares the acquired position with course data 140 to determine if the vehicle is on course (710) or if the vehicle has reached the intended destination (725). If the vehicle's position is not consistent with course data 140, processing unit 120 records the deviation (720). Processing unit 120 also compares the deviation with prior deviations and records the number of times that the vehicle has made the same deviation from course data 140. If the number of identical deviations exceeds a user-configured parameter, processing unit 120 records the deviation in travel history 260, as shown in FIG. 7. Alternatively, processing unit 120 records each deviation in travel history 260, and the burden of determining if the number of deviations exceeds the user-configured parameter shifts to Course Adaptation Program 202.

FIG. 8 is a functional block diagram that illustrates how the novel components just described interact with conventional components, such as those in FIG. 1. The principle distinction between the conventional system of FIG. 1 and the inventive system of FIG. 2 is the addition of alternate course data 141, and selected navigable features 800 to user data 130. As described above, Navigable Features Selection Program 252 provides an interface to processing unit 120 through which a user can enter or select such navigable features. FIG. 8 also includes travel history 260, indicating that processing unit 120 can store data in travel history 260 as described above, and that it can read travel history 260, as described more fully below.

Figure 9:
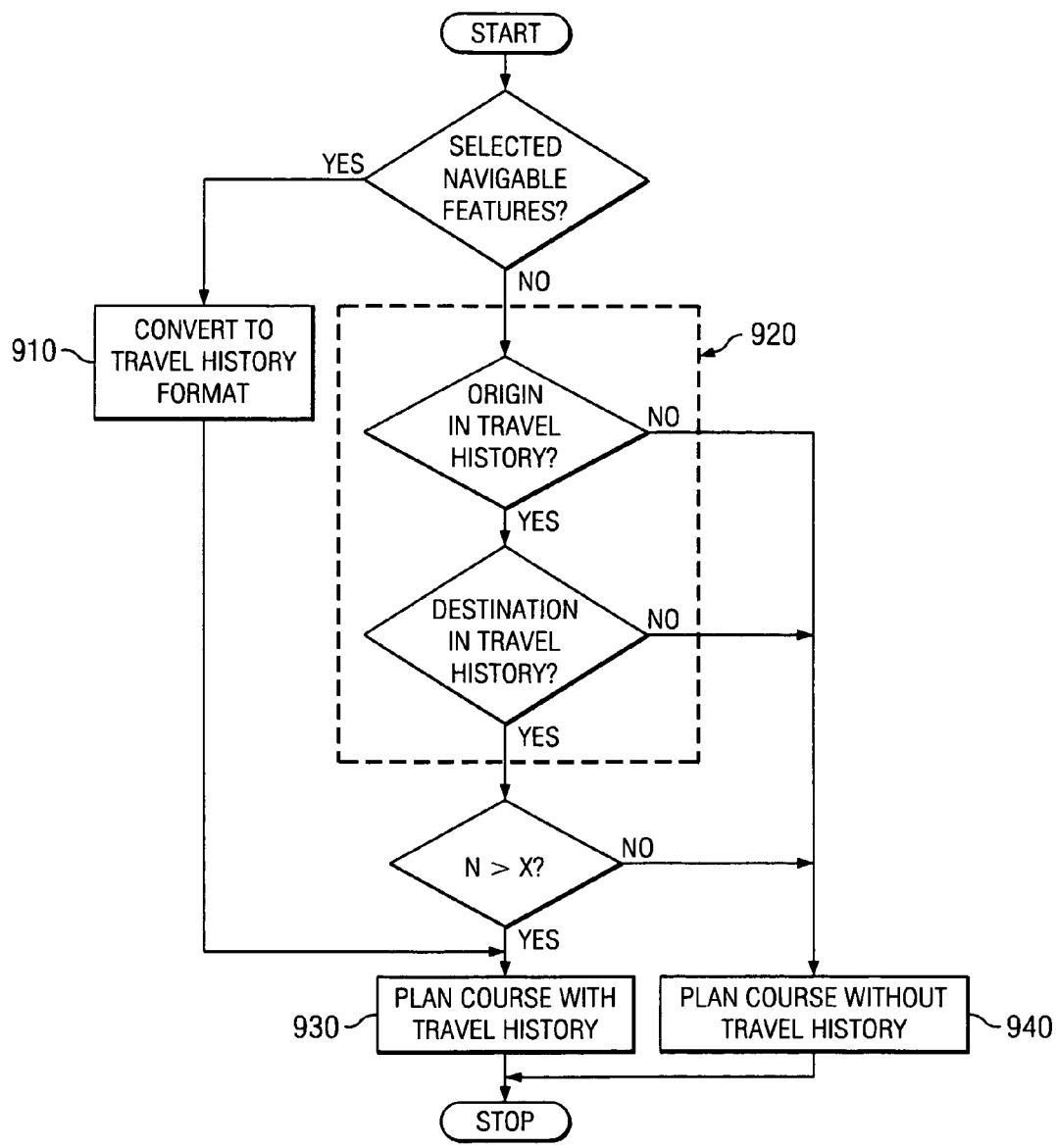
FIG. 9 is a flowchart of the Course Adaptation Program.

FIG. 9 is a flowchart of Course Adaptation Program 202, which generates alternate course data 141 based upon a user's selected navigable features, travel history 260, or both. In general, Course Adaptation Program 202 modifies conventional navigation system functions only if one of the methods described above is expressly activated or configured by the user. Thus, FIG. 9 and the following description assume that one or more of the novel methods described above have been activated on at least one occasion. Moreover, this description of Course Adaptation Program 202 assumes that the user has selected navigable features as described with reference to FIG. 4, that alternate course data has been stored in travel history 260, or both. If Course Adaptation Program 202 is activated by the user after selecting an alternate course, as described in the first method above with reference to FIG. 5, Course Adaptation Program 202 first converts the navigable features of the alternate course to a format that is consistent with the format of travel history 260 (910). This conversion allows Course Adaptation Program 202 to proceed with the same logic regardless of the source of data. Accordingly, when a user requests the navigation system to plan or alter a course between points A and B (see FIG. 3), Course Adaptation Program 202 compares points A and B with travel history 260 (920). If points A and B are in travel history 260, Course Adaptation Program 202 generates alternate course data 141 (930) based upon travel history 260, rather than course data 140 based upon map data 110 (940).

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. In a vehicle navigation system having an input device and a display device, the input device having a command activator and a graphical selection pointer, the display device having a map drawn thereon, the map comprising the vehicle's current position and a planned course of navigable features between an origin and a destination in a geographic area, a method of modifying the planned course, the method comprising:

identifying navigable feature segments in the geographic area, wherein each navigable feature segment has a terminus coincident with an intersection between two navigable features;

receiving a start signal from the input device indicating that the command activator has been activated;

drawing the navigable feature segments on the map;

receiving selection signals from the input device indicating that the graphical selection pointer has selected one or more navigable feature segments;

drawing the planned course and the selected navigable feature segments as blinking elements on the map if the selected navigable feature segments do not comprise an alternate course between the vehicle's current position and the destination or between the vehicle's current position and any position along the planned course;

replacing the navigable features of the planned course with the selected navigable feature segments if the selected navigable feature segments comprise an alternate course between the vehicle's current position and the destination; and identifying unnecessary navigable features of the planned course and replacing the unnecessary navigable features of the planned course with the selected navigable feature segments if the selected navigable feature segments comprise an alternate course between the vehicle's current position and any position along the planned course.

2. The method of claim 1, wherein the input device further has a second command activator, and the method further comprises:

receiving a save signal from the input device indicating that the second command activator has been activated;

responsive to receiving the save signal, storing the alternate course in a travel history database so that the vehicle navigation system includes the alternate course when planning a course between the origin and the destination.

3. In a vehicle navigation system having an input device and a display device, the input device having a first command activator, a second command activator, and a graphical selection pointer, the display device having a map drawn thereon, the map comprising the vehicle's current position and a planned course of navigable features between an origin and a destination in a geographic area, a method of modifying the planned course, the method comprising:

receiving a start signal from the input device indicating that the first command activator has been activated and the vehicle is about to deviate from the planned course;

responsive to receiving the start signal, acquiring the vehicle's position and storing the vehicle's position as a deviation point in a travel history database;

acquiring the vehicle's subsequent positions at regular intervals and storing the subsequent positions in the travel history database until receiving a stop signal from the input device indicating that the second command activator has been activated;

responsive to receiving the stop signal, acquiring the vehicle's position and storing the vehicle's position as the destination in the travel history database;

whereby the vehicle navigation system includes the positions stored in the travel history database when planning a course between the deviation point and the destination.

4. The method of claim 3, wherein the input device further comprises a third command activator, and the method further comprises:

receiving a path signal from the input device indicating that the third command activator has been activated;

responsive to receiving the path signal, acquiring the vehicle's position and storing the vehicle's position as a path point in the travel history database.

* * * * *